United States Patent
Boxwell et al.

(10) Patent No.: US 9,720,905 B2
(45) Date of Patent: Aug. 1, 2017

(54) AUGMENTED TEXT SEARCH WITH SYNTACTIC INFORMATION

(71) Applicant: International Business Machines Corporation, Armonk, NY (US)

(72) Inventors: Stephen A. Boxwell, Dublin, OH (US); Christopher M. Nolan, Acton, MA (US); William G. Visotski, Merrimack, NH (US); David E. Wilson, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/746,564

(22) Filed: Jun. 22, 2015

(65) Prior Publication Data

US 2016/0371247 A1 Dec. 22, 2016

(51) Int. Cl.
*G06F 17/27* (2006.01)
*G06F 17/30* (2006.01)

(52) U.S. Cl.
CPC ........ *G06F 17/2785* (2013.01); *G06F 17/271* (2013.01); *G06F 17/278* (2013.01); *G06F 17/2775* (2013.01); *G06F 17/30401* (2013.01); *G06F 17/30525* (2013.01); *G06F 17/30528* (2013.01); *G06F 17/30976* (2013.01); *G06F 17/274* (2013.01)

(58) Field of Classification Search
CPC ............ G06F 17/2785; G06F 17/2755; G06F 17/274; G06F 17/271; G06F 17/277; G06F 17/2735; G06F 17/2795

USPC ........................................................ 704/9, 10
See application file for complete search history.

(56) References Cited

U.S. PATENT DOCUMENTS

| | | | |
|---|---|---|---|
| 6,219,664 B1 | 4/2001 | Watanabe | |
| 6,353,925 B1 * | 3/2002 | Stata | G06F 8/427 |
| | | | 704/9 |
| 7,254,530 B2 * | 8/2007 | Klavans | G06F 17/2735 |
| | | | 704/10 |
| 7,689,411 B2 | 3/2010 | Sandor et al. | |
| 8,060,357 B2 | 11/2011 | Segond et al. | |
| 8,155,946 B2 | 4/2012 | Hudson et al. | |
| 8,244,730 B2 | 8/2012 | Gupta | |
| 8,374,844 B2 | 2/2013 | Brun et al. | |
| 8,639,708 B2 | 1/2014 | Van Den Berg et al. | |
| 8,712,758 B2 | 4/2014 | Crouch et al. | |

(Continued)

OTHER PUBLICATIONS

Boxwell et al., "Augmented Text Search with Syntactic Information," U.S. Appl. No. 14/859,712, filed Sep. 21, 2015, 36 pages.

(Continued)

*Primary Examiner* — Vu B Hang
(74) *Attorney, Agent, or Firm* — VanLeeuwen & VanLeeuwen; William J. Stock (57) ABSTRACT

An approach is provided in which a knowledge manager generates syntactic annotation tokens that correspond to syntactic relationships between terms included in a source document. The knowledge manager creates a knowledge structure that stores the syntactic annotation tokens in parallel fields and stores the source document terms in original text fields, which align to the parallel fields. In turn, the knowledge manager utilizes the knowledge structure to generate answers to questions based upon the syntactic annotation tokens.

13 Claims, 9 Drawing Sheets

(56) References Cited

U.S. PATENT DOCUMENTS

| | | | |
|---|---|---|---|
| 8,856,096 | B2 | 10/2014 | Marchisio et al. |
| 2006/0277165 | A1* | 12/2006 | Yoshimura ........ G06F 17/30684 |
| 2007/0073533 | A1 | 3/2007 | Thione et al. |
| 2009/0282019 | A1 | 11/2009 | Galitsky et al. |
| 2014/0114649 | A1 | 4/2014 | Zuev et al. |
| 2014/0163962 | A1 | 6/2014 | Castelli et al. |

OTHER PUBLICATIONS

"List of IBM Patents or Patent Applications Treated as Related," Letter from Leslie A. Van Leeuwen, Sep. 21, 2015, 1 page.

Li et al., "Syntactic Features in Question Answering," SIGIR'03 Proceedings of the 26th Annual International ACM SIGIR Conference on Research and Development in Information Retrieval, Toronto, Canada, Jul. 28-Aug. 1, 2003, pp. 383-384.

Mousavi et al., "Mining Semantic Structures From Syntactic Structures in Free Text Document," 2014 IEEE International Conference on Semantic Computing (ICSC), Newport Beach, California, Jun. 16-18, 2014, pp. 84-91.

Bethard et al., "Timelines From Text: Identification of Syntactic Temporal Relations," 2007 IEEE International Conference on Semantic Computing, ICSC, Irvine, California, Sep. 17-19, 2007, pp. 11-18.

Snow et al., "Learning Syntactic Patterns for Automatic Hypernym Discovery," Advance in Neural Infromation Processing Systems, NIPS 17, 2004, pp. 1-8.

* cited by examiner

AUGMENTED TEXT SEARCH WITH SYNTACTIC INFORMATION

BACKGROUND

System developers typically train question answer systems by ingesting corpora from trusted, traditional sources (textbooks, journals) that include accurate information. At times, a system developer may train a question answer system to a specific domain to increase the question answer system's accuracy (e.g., financial domain, travel domain, etc.).

Once the question answer system is trained, the question answer system receives questions and performs queries on the trained domain using queries such as Span Near queries, or "spannear" queries. Spannear queries search for two words in a domain that appear close to each other. For example, if searching for "Who is the president of Company ABC?" the question answer system may generate "spannear (president,of) and spannear(of, Company ABC)" to search a business domain. The question answer system, in turn, may rank candidate answers based upon the proximity of the matched words within a sentence. For example, the sentence "John Doe is president of Company ABC" may rank higher than the sentence "John Doe replaced Sally Smith in 2010 as president of Company ABC."

BRIEF SUMMARY

According to one embodiment of the present disclosure, an approach is provided in which a knowledge manager generates syntactic annotation tokens that correspond to syntactic relationships between terms included in a source document. The knowledge manager creates a knowledge structure that stores the syntactic annotation tokens in parallel fields and stores the source document terms in original text fields, which align to the parallel fields. In turn, the knowledge manager utilizes the knowledge structure to generate answers to questions based upon the syntactic annotation tokens.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
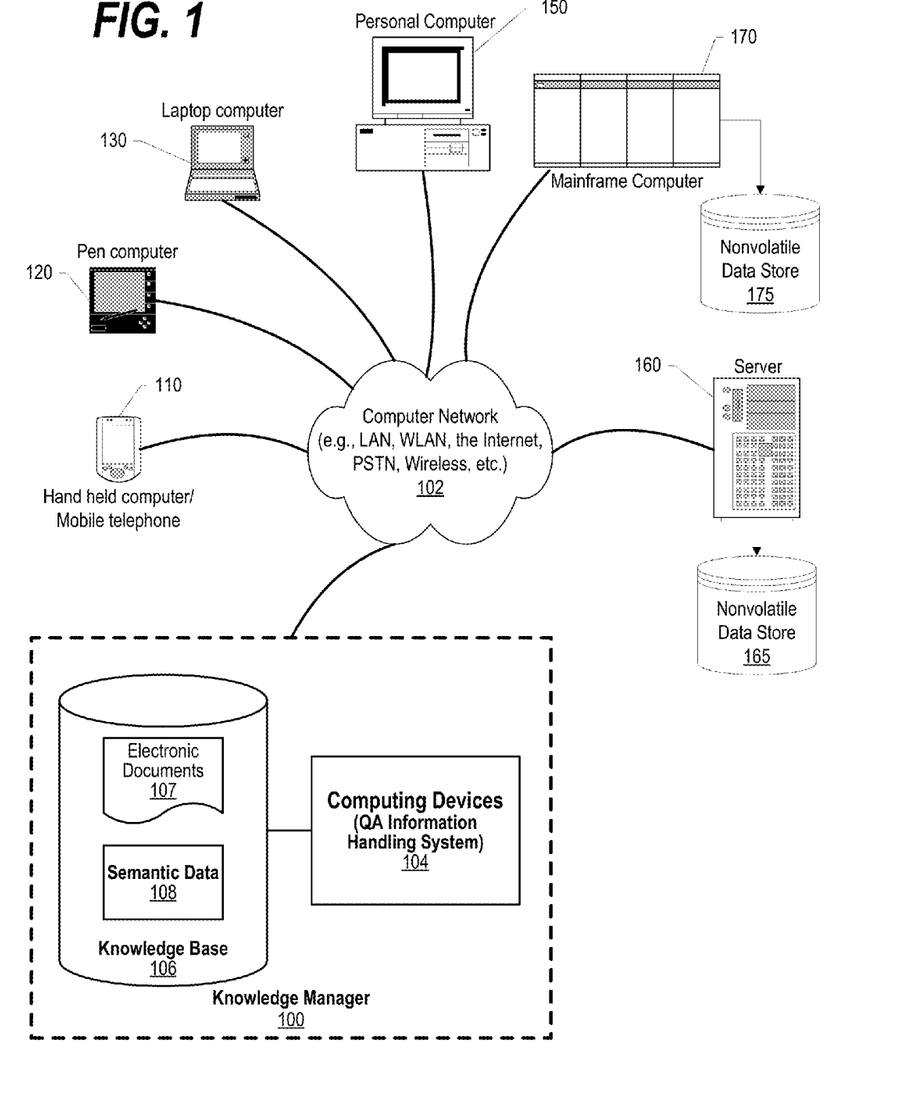
FIG. 1 depicts a schematic diagram of one illustrative embodiment of a knowledge manager system in a computer network.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
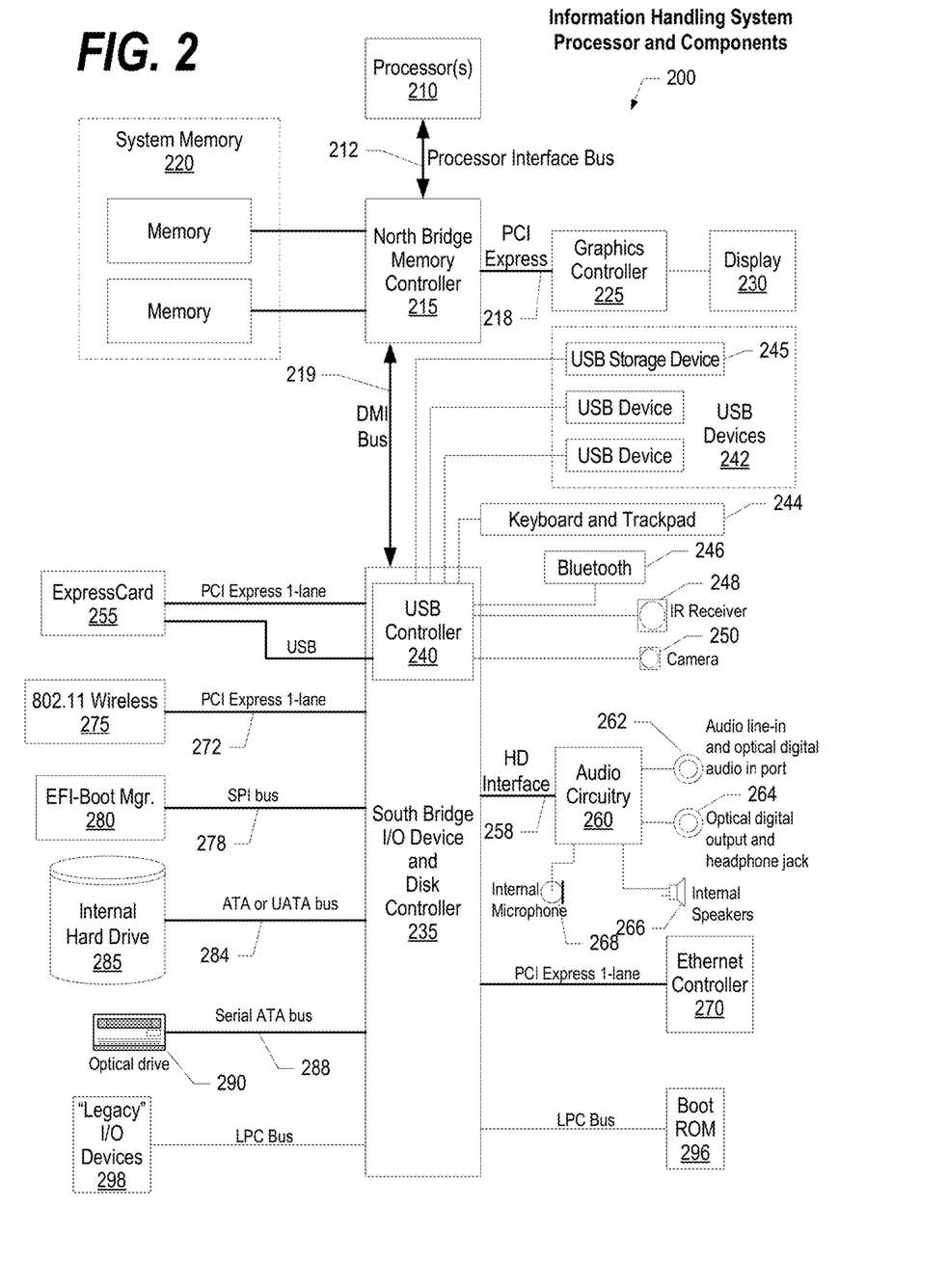
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-9 depict an approach that can be executed on an information handling system. A knowledge manager generates syntactic annotation tokens based upon syntactic relationships between terms included in a source document. The knowledge manager generates a knowledge structure that includes the terms in original text fields and includes the syntactic annotation tokens in parallel fields that align to the original text fields. The syntactic annotation tokens link terms that are distant from each other and, as such, allow the information handling system to perform enhanced query searches. In turn, the knowledge manager generates a query based upon a question and uses the query to search the knowledge structure for answers to the question based upon the syntactic annotation tokens.

Figure 3:
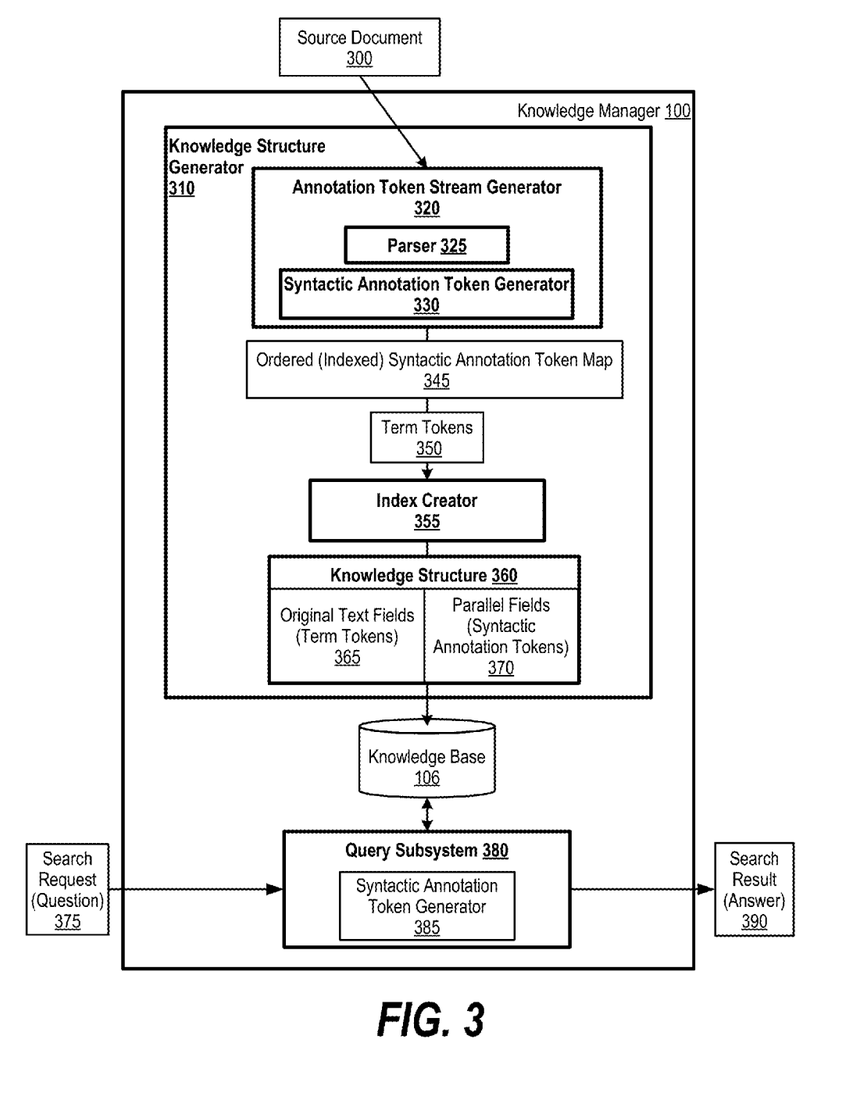
FIG. 3 is an exemplary diagram depicting a knowledge manager that generates syntactic annotation tokens based upon syntactic relations identified within a source document and stores the syntactic annotation tokens in parallel fields within a knowledge structure to improve query searches.

FIG. 3 is an exemplary diagram depicting a knowledge manager that generates syntactic annotation tokens based upon syntactic relations identified within a source document and stores the syntactic annotation tokens in parallel fields within a knowledge structure to improve query searches.

Figure 4:
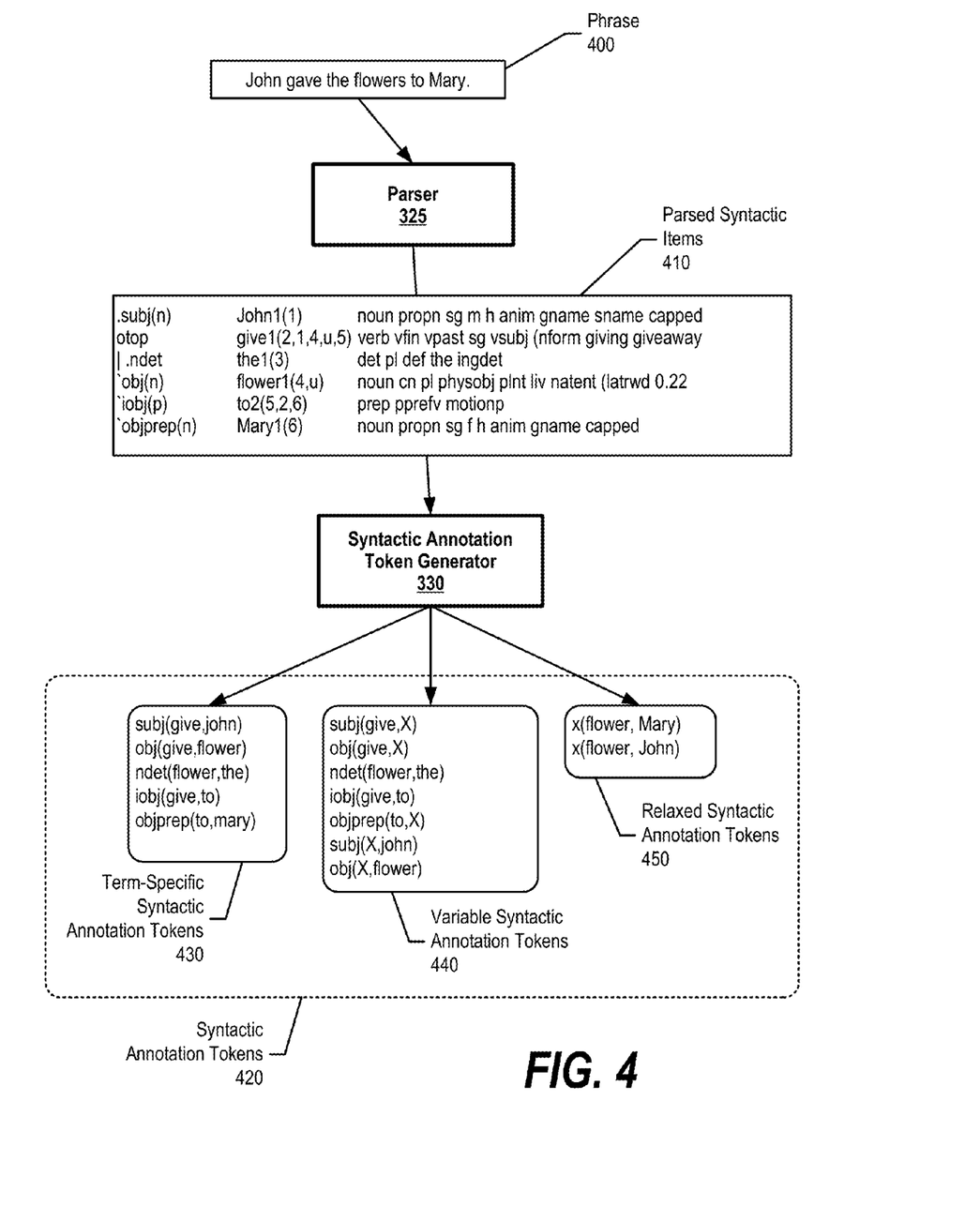
FIG. 4 is an exemplary diagram depicting a parser and syntactic annotation token generator that transforms a source document phrase into various types of syntactic annotation tokens.

Knowledge manager 100 includes annotation token stream generator 320, which includes parser 325 and syntactic annotation token generator 330. Knowledge manager 100 receives source documents 300 and parses the source document using parser 325. Parser 325 may be, for example, an ESG (English Slot Grammar) parser that identifies syntactic relationships between words in phrases included in source document 300. Referring to FIG. 4, parser 325 parses phrase 400 "John gave the flowers to Mary" into six items in parsed syntactic items 410.

Syntactic annotation token generator 330 analyzes the syntactic relationships of the syntactic items and generates syntactic annotation tokens that may be, for example, in the form of term-specific syntactic annotation tokens, variable syntactic annotation tokens, and/or relaxed syntactic annotation tokens. In one embodiment, syntactic annotation token generator determines which type of syntactic annotation token to generate based upon user preferences, which may include any or all of the types of above mentioned syntactic annotation tokens. For example, if the source document includes the sentence "John ate the steak", syntactic annotation token generator 330 may generate three term-specific syntactic annotation tokens of subject(eat, John), object(eat,steak), and ndet(steak,the) (see FIG. 4 and corresponding text for further details).

Knowledge manager 100 may also adapt indexing of syntactic information to represent relationships of sets of syntactic arguments in a manner similar to a first-order predicate logic representation. For example, if source document 300 includes the sentence "John ate the steak", the knowledge manager may construct a syntactic annotation token of "ate(John,steak)", which enables knowledge manager 100 to identify the syntactic relationship in the index. In one embodiment, knowledge manager 100 may introduce variables into the relationship such as "ate(X,steak)" and "ate(John,X)", which may be searched over with questions such as "Who ate the steak", "John ate this". By introducing variables within the syntactic annotation tokens during indexing, knowledge manager 100 is able to efficiently search over a knowledge structure without changes to an existing search engine.

In another embodiment, knowledge manager 100 may capture the existence of a syntactic/semantic relationship between two words even when a verb is dissimilar. For example, if knowledge manager 100 receives a question of "When did Turkey ban YouTube" and a source document includes the sentence "Turkey blocked YouTube in 2011", then a mismatch exists between the question verb and the source document sentence verb, which results in a degraded search. To resolve the verb mismatch, knowledge manager 100 introduces a relaxed syntactic annotation token during indexing such as X(Turkey,Youtube), which captures each relationship between Turkey and YouTube (see FIG. 4, reference numeral 450). In addition, knowledge manager 100 may generalize verbs into broad classes, such as "STOP" that encompasses "ban", "block", "disable", etc.

Annotation token stream generator 320 places the syntactic annotation tokens in an ordered manner (ordered syntactic annotation token map 345), which are aligned with their corresponding original terms from source document 300 (term tokens 350). Index creator 355 indexes term tokens 350 and ordered syntactic annotation token map 345 into their respective original text fields 365 and parallel fields 370 to create knowledge structure 360, which is stored in knowledge base 106. As discussed in more detail below, knowledge structure 360 aligns the term tokens with their respective syntactic annotation tokens for enhanced query searches (see FIGS. 5-9 and corresponding text for further details).

Query subsystem 380 accesses knowledge structure 360 when query subsystem 380 receives search request 370. Query subsystem 380 uses syntactic annotation token generator 385 to generate question-based syntactic annotation tokens from search request 375. For example, search request 375 may be "Who ate the steak?" in which case syntactic annotation token generator 385 generates question-based syntactic annotation tokens of "object(eat,steak)" and "ndet (steak,the)". Query subsystem 380 includes the question-based syntactic annotation tokens in a query and queries knowledge structure 360 and identify candidate answers. In turn, query subsystem 380 provides search results 390 that include a list of ranked answers.

FIG. 4 is an exemplary diagram depicting a parser and syntactic annotation token generator that transforms a source document phrase into various types of syntactic annotation tokens. Parser 325 parses phrase 400 into parsed syntactic items 410. Parser 325, in one embodiment, is an ESG parser that identifies syntactic relationships between words. As shown in FIG. 4, parser 325 identifies six relationships that include a subject, a determiner, an object, an indirect object, an object preposition, and a "top" relation indicating the root word of phrase 400.

Syntactic annotation token generator 330 analyzes parsed syntactic items 410 and generates syntactic annotation tokens 420. Syntactic annotation tokens 420 may include term-specific syntactic annotation tokens 430, variable syntactic annotation tokens 440, and/or relaxed syntactic annotation tokens 450. Term-specific syntactic annotation tokens provide high-precision recovery of specific syntactic relationships, while variable and relaxed syntactic annotation tokens provide high-recall recovery of broad classes of syntactic relationships. The syntactic annotation tokens are then ordered and indexed into knowledge structure 360's parallel fields (see FIG. 5 and corresponding text for further details).

Figure 5:
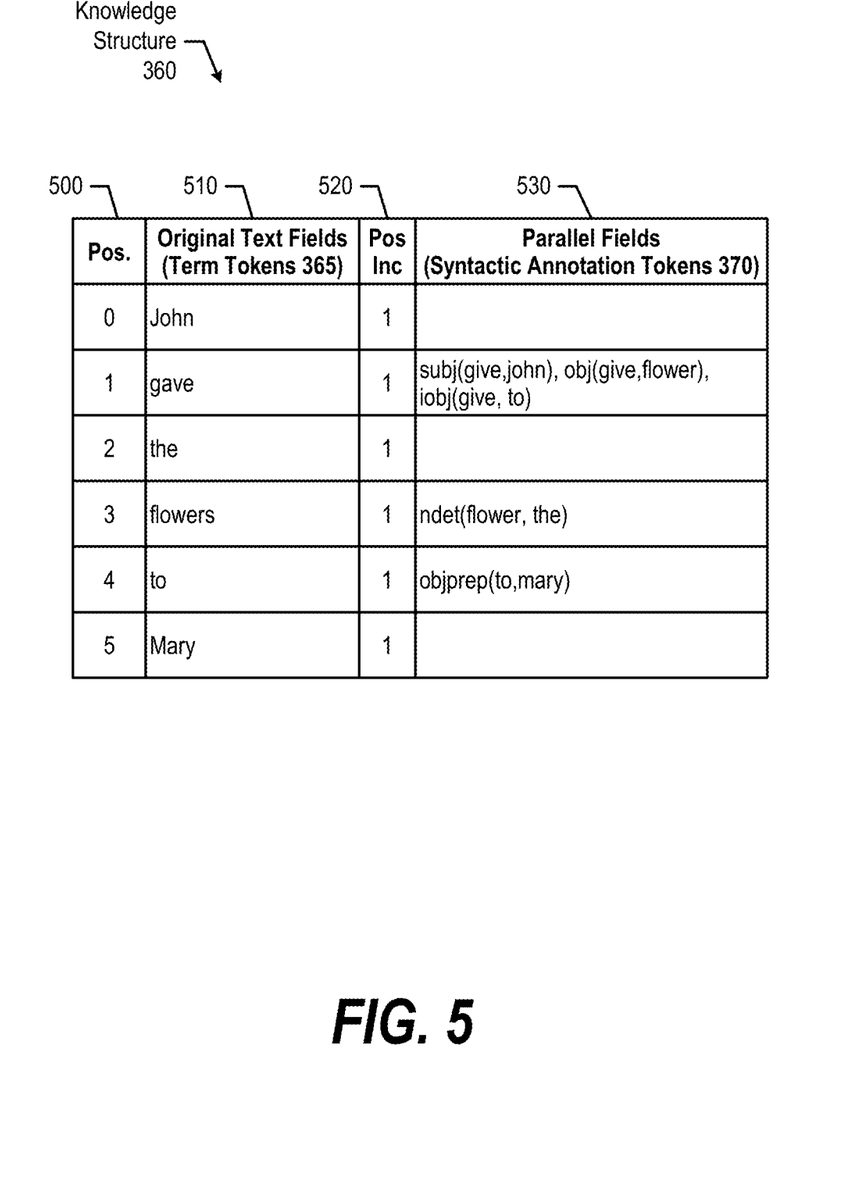
FIG. 5 is an exemplary diagram depicting a knowledge structure that includes original text terms stored in original text fields and syntactic annotation tokens stored in corresponding parallel fields.

FIG. 5 is an exemplary diagram depicting a knowledge structure that includes original text terms stored in original text fields and syntactic annotation tokens stored in corresponding parallel fields. Knowledge structure 360 includes columns 500, 510, 520, and 530. As those skilled in the art can appreciate, knowledge structure 330 may take on other forms besides a table, such as a data array, a database, or other type of structure that allows syntactic annotation tokens to align with term tokens at a term position resolution.

Column 500 includes a list of term positions of original text. The example shown in FIG. 4 is a first sentence in a document. As such, the first term "John" is located at the first position in knowledge structure 360. Column 510 includes original text fields and corresponding term tokens (e.g., original words). Each term token includes a term and term location information that indicates the term location in the original text stream. Column 520 includes a list of position increments that indicate the number of positions between the term tokens. The embodiment in FIG. 5 shows that each of the position increments are "1" because a term token is stored in each original text field position.

Column 530 includes a set of parallel fields that store the syntactic annotation tokens and align to their corresponding text token in column 510. The embodiment in FIG. 5 shows that the syntactic annotation tokens are stored in parallel fields corresponding to the first word in parenthesis. For example, in position 1, subj(give,John), obj(give,flower), iobj(give,to) are all stored in the parallel field corresponding to "gave." In another embodiment, the tokens are aligned with the second word in the pair ("John", "flower", and "to", respectively).

Figure 6:
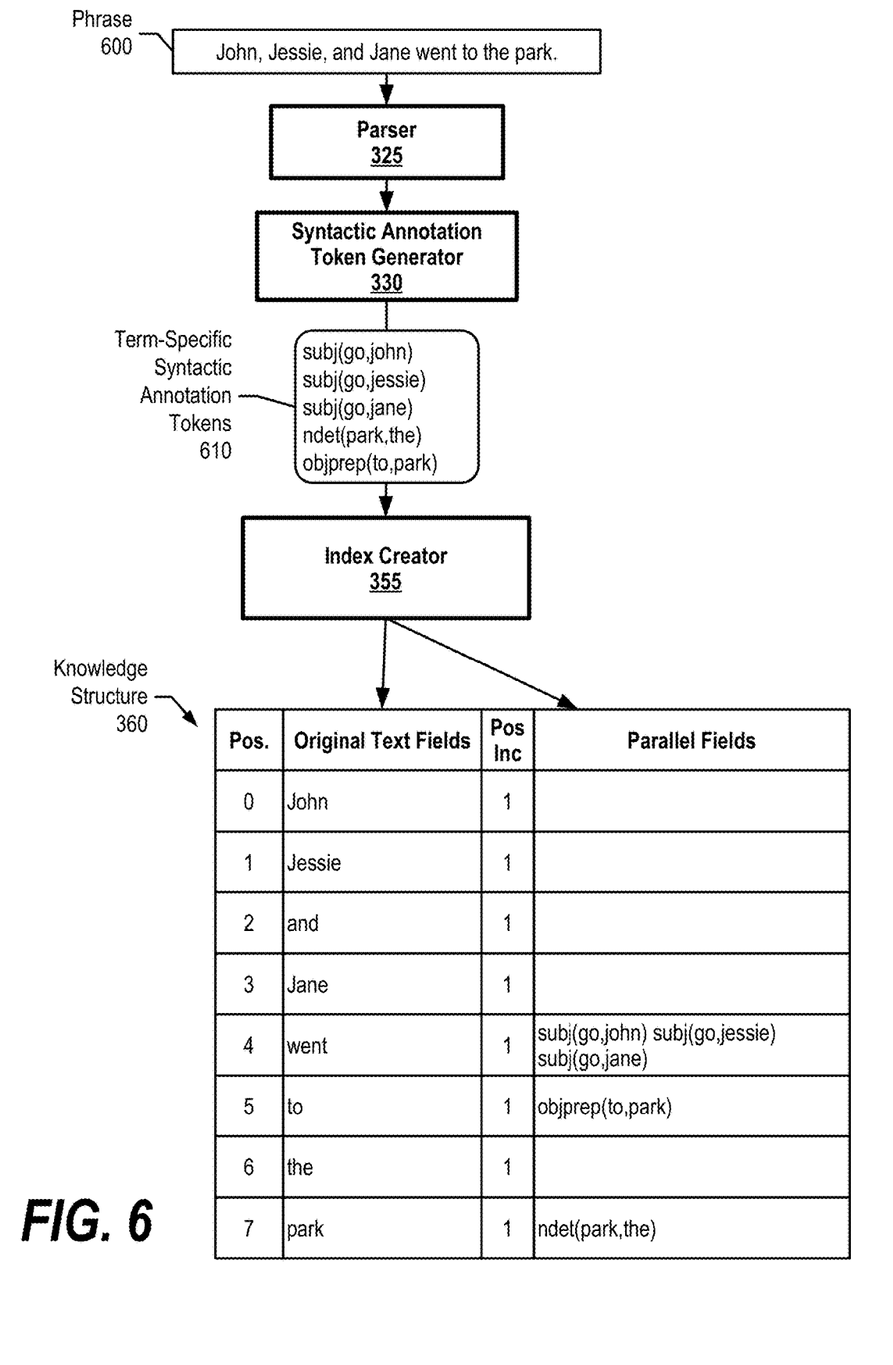
FIG. 6 is an exemplary diagram depicting syntactic annotation tokens indexed into a knowledge structure.

FIG. 6 is an exemplary diagram depicting syntactic annotation tokens indexed into a knowledge structure. Parser 325 parses phrase 600 into syntactic relationships as discussed herein, and syntactic annotation token generator 330 generates term-specific syntactic annotation tokens 610 from the parsed syntactic relationships. As can be seen, term-specific syntactic annotation tokens 610 include separate entries for each of subjects "John," "Jessie," and "Jane", which are all associated with going to the park.

Index creator 355 uses an ordered annotation map generated from term-specific syntactic annotation tokens 610 to align the syntactic annotation tokens into their corresponding parallel fields. In one embodiment, knowledge manager 100 includes an annotation token stream generator to align (index) the syntactic annotation tokens to the original text stream and create an ordered annotation token map. In this embodiment, the annotation token stream generator generates term tokens from the terms included in phrase 600 and uses an alignment algorithm to position the term tokens with the corresponding syntactic annotation tokens from the unordered annotation token map. In one embodiment, the ordered annotation token map is in the form of a data engine that is a machine-readable mapping organized by annotation type.

Index creator 355 indexes the term tokens into the original text fields based on their position (position 1, 2, . . . ) and indexes the syntactic annotation tokens into their respective parallel fields based upon their aligned position assigned by annotation token stream generator 320. FIG. 6 shows that each of the subject syntactic annotation token subjects are stored in position 4 because "go" in the syntactic annotation tokens corresponds to "went" in the term tokens. As such, query subsystem 380 provides accurate answers to a question such as "Where did John go?" even though "John" and "park" are far apart in phrase 600.

Figure 7:
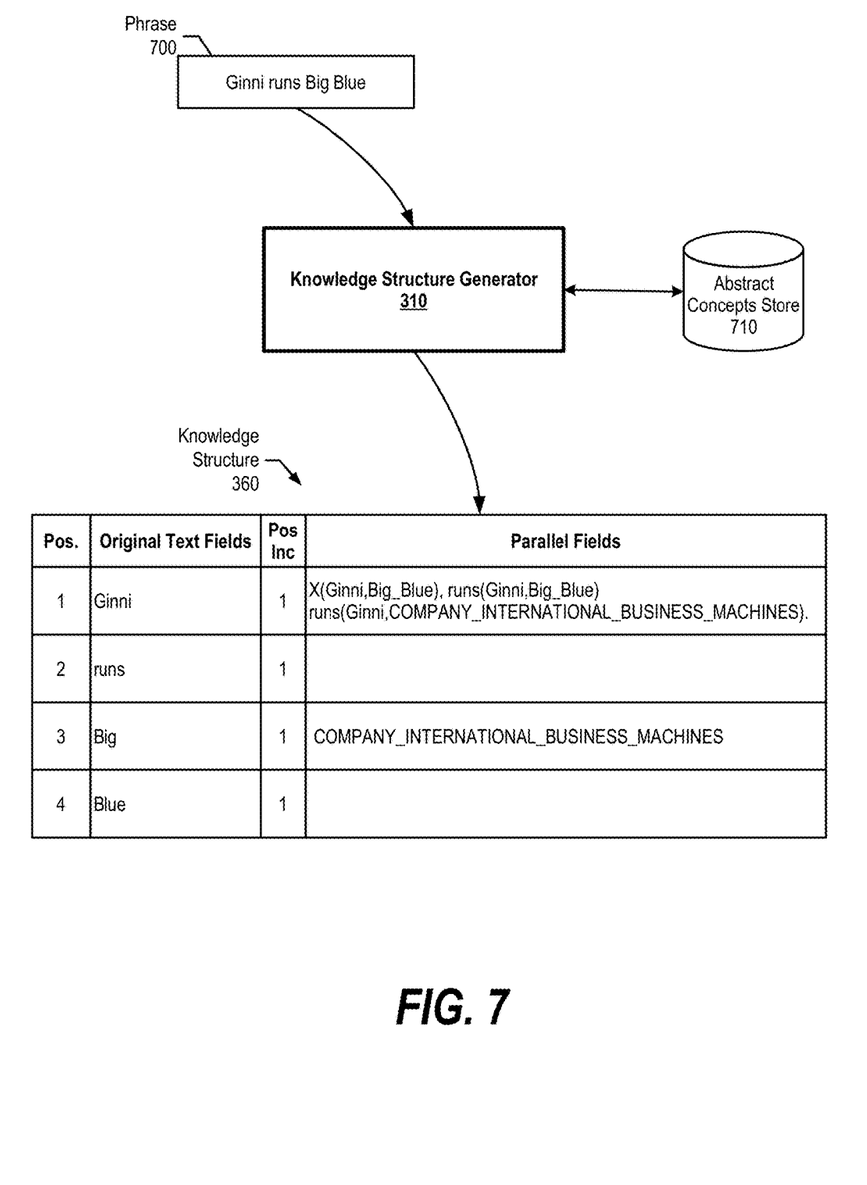
FIG. 7 is an exemplary diagram depicting an embodiment of the present disclosure that adds abstract syntactic annotation tokens to parallel fields.

FIG. 7 is an exemplary diagram depicting an embodiment of the present disclosure that adds abstract syntactic annotation tokens to parallel fields. In this embodiment, knowledge structure generator 310 analyzes phrase 700 relative to abstract concepts stored in abstract concepts store 710 to add abstract tokens to knowledge structure 330's parallel fields. Abstract concepts store 710 may include, for example, abstract concept entries that associate terms that are synonyms.

FIG. 7 shows phrase 700, which is "Ginni runs Big Blue." Knowledge structure generator 310 may identify an abstract concept entry that associates "Big Blue" with "International Business Machines". As such, knowledge structure generator creates abstract syntactic annotation tokens that replace "Big Blue" with "COMPANY_INTERNATIONAL_BUSINESS_MACHINES." Knowledge structure 360 shows that position 1 includes an additional syntactic annotation of "runs(Ginni, COMPANY_INTERNATIONAL_BUSINESS_MACHINES) and position 3 associates Big Blue with "COMPANY_INTERNATIONAL_BUSINESS_MACHINES." In turn, query subsystem 380 may answer a question "Who runs Big Blue?" as well as "Who runs International Business Machines?"

Figure 8:
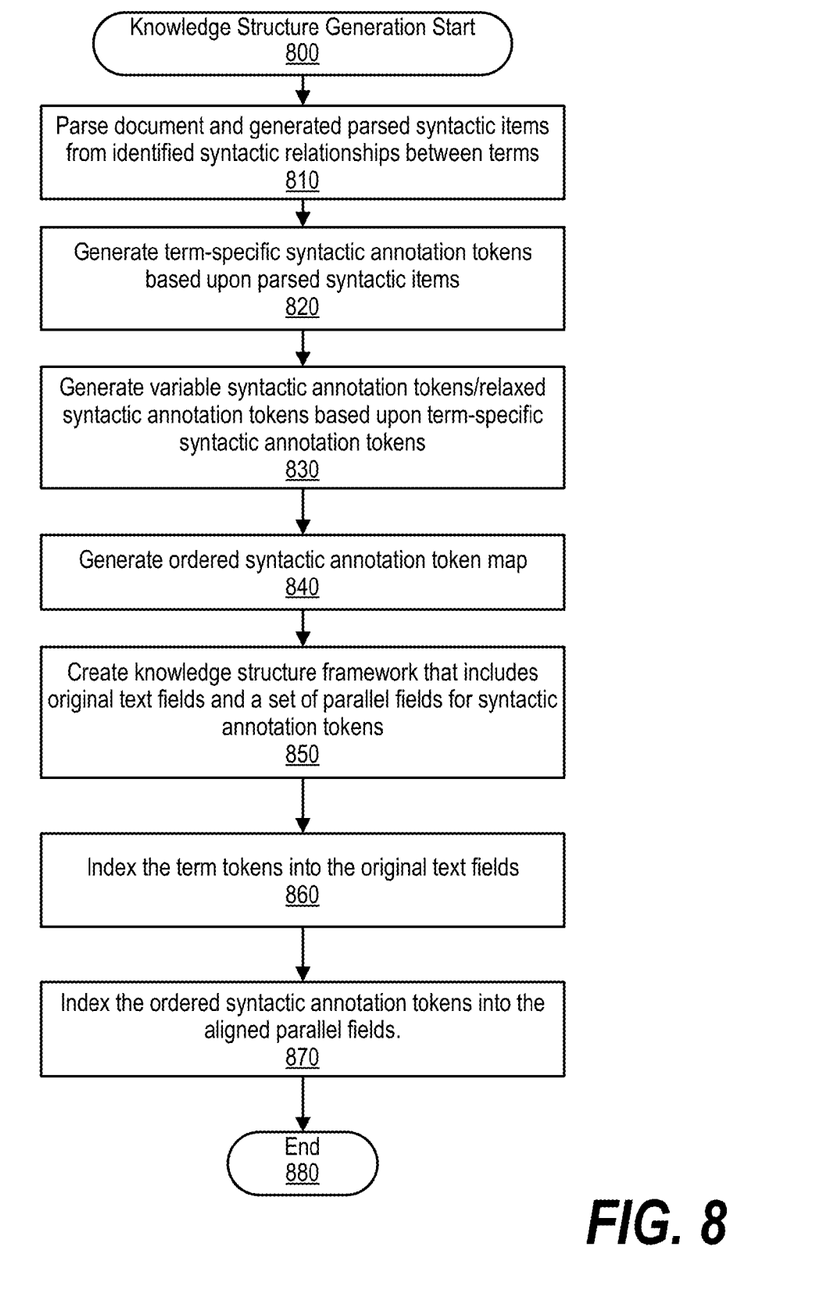
FIG. 8 is an exemplary flowchart depicting steps taken by a knowledge manager to generate a knowledge structure that includes syntactic annotation tokens in parallel fields to enhance query searches.

FIG. 8 is an exemplary flowchart depicting steps taken by a knowledge manager to generate a knowledge structure that includes syntactic annotation tokens in parallel fields to enhance query searches. Processing commences at 800 whereupon at step 810, the process parses a document and generates parsed syntactic items based upon syntactic relationships of terms within the document.

At step 820, the process generates term-specific syntactic annotation tokens corresponding to the identified syntactic relationships, such as "subject(eat,John)" or "object(eat, steak)". At step 830, the process, in one embodiment, generates variable syntactic annotation tokens and/or relaxed syntactic annotation tokens based upon the term-specific syntactic annotation tokens generated in step 820. In this embodiment, the knowledge manager may extract the same syntactic relations as in step 810 but replace each object with a variable to create variable syntactic annotation tokens, such as "subject(eat,X)", "subject(X,John)", "object (X,steak)", and "object(eat,X)". The process may also create relaxed syntactic annotation tokens at this step by replacing the syntactic relationship identifiers with a variable, such as "X(eat,John)" or "X(eat,steak)."

At step 840, the process generates an ordered syntactic annotation token map that orders the syntactic annotation tokens based upon their corresponding original terms. At step 850, the process creates a knowledge structure framework that includes original text fields and a set of parallel fields for the syntactic annotation tokens. At step 860, the process indexes the term tokens into the original text fields and, at step 870, the process indexes the ordered syntactic annotation token tokens into the aligned parallel fields (see FIGS. 5-7 and corresponding text for further details). FIG. 8 processing thereafter ends at 880. In one embodiment, instead of or in addition to including a specific word in the term-specific annotation tokens, the process replaces a word in the syntactic annotation token with an abstract concept corresponding to the word. For example, in the sentence "Ginni runs Big Blue", instead of obj(run,blue), the process may generate obj(run,COMPANY_INTERNATIONAL_BUSINESS_MACHINES_CORPORATION).

Figure 9:
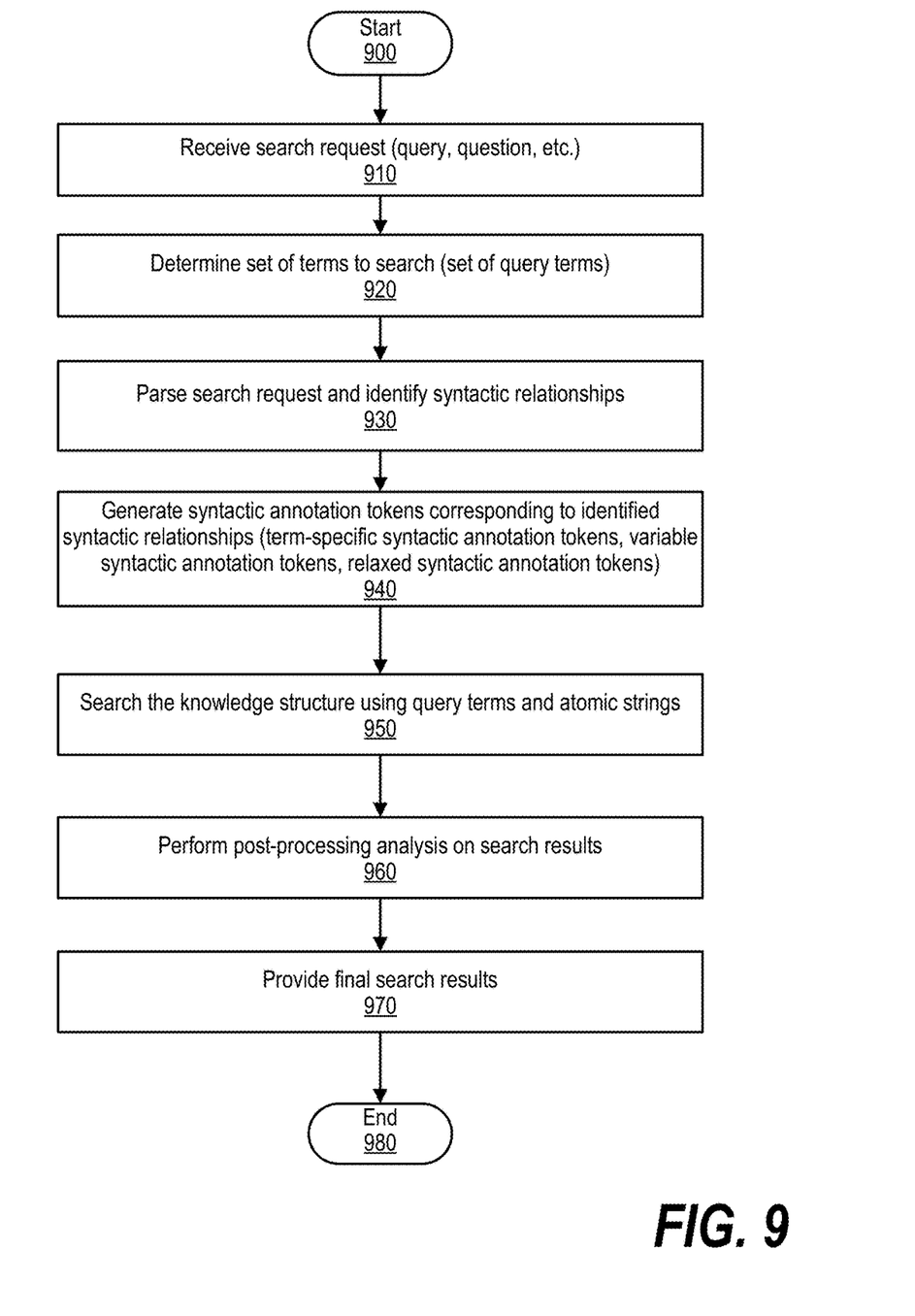
FIG. 9 is an exemplary flowchart depicting steps taken by a knowledge manager to generate queries from a search request and search a knowledge structure using the generated queries.

FIG. 9 is an exemplary flowchart depicting steps taken by a knowledge manager to generate queries from a search request and search a knowledge structure using the generated queries. Processing commences at 900 whereupon, at step 910, the process receives a search request (query, question, etc.). At step 920, the process determines a set of terms to search upon by removing common and uninformative words such as "the" and "an", and, at step 930, the process parses the search request and identifies question-based syntactic relationships between terms in the search request.

At step 940, the process generates question-based syntactic annotation tokens corresponding to question-based syntactic relationships between the terms (term-specific syntactic annotation tokens, variable syntactic annotation tokens, relaxed syntactic annotation tokens). At step 950, the process searches the knowledge structure using the query terms and the question-based syntactic annotation tokens. At step 960, the process performs post-processing analysis on search results, such as ranking the search results and, at step 970, the process provides the search results to, for example, a user interface. FIG. 9 processing thereafter ends at 980.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. It will be understood by those with skill in the art that if a specific number of an introduced claim element is intended, such intent will be explicitly recited in the claim, and in the absence of such recitation no such limitation is present.

For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
a memory coupled to at least one of the processors; and
a set of computer program instructions stored in the memory and executed by at least one of the processors in order to perform actions of:
generating a plurality of syntactic annotation tokens based upon a plurality of syntactic relationships between a plurality of terms included in a source document;
creating a knowledge structure that includes the plurality of terms in a plurality of original text fields and includes the plurality of syntactic annotation tokens in a plurality of parallel fields, wherein each of the plurality of syntactic annotation tokens align to at least one of the plurality of original text fields; and generating one or more question-based syntactic annotation tokens corresponding to a question; and utilizing the knowledge structure in a question answer system to generate one or more answers to the question, wherein the question answer system matches at least one of the one or more question-based syntactic annotation tokens to at least one of the plurality of syntactic annotation tokens during the generation of at least one of the one or more answers.

2. The information handling system of claim 1 wherein at least one of the one or more processors perform additional actions comprising:

analyzing the question and identifying one or more question-based syntactic relationships between question terms in the question;

generating the one or more question-based syntactic annotation tokens based upon the question-based syntactic relationships;

including the question-based syntactic annotation tokens in a query; and using the query in the querying of the knowledge structure.

3. The information handling system of claim 2 wherein at least one of the one or more processors perform additional actions comprising:

identifying a selected one of the plurality of original text fields that align to the selected parallel field; and generating one or more candidate answers utilizing one or more of the plurality of terms included in the selected original text field.

4. The information handling system of claim 1 wherein, during the generation of the knowledge structure, at least one of the one or more processors perform additional actions comprising:

matching a selected one of the plurality of terms to an abstract concept entry, wherein the abstract concept entry includes the selected term and a different term;

for each of the plurality of syntactic annotation tokens that include the selected term, creating an abstract syntactic annotation token that replaces the selected term with the different term, resulting in one or more abstract syntactic annotation tokens; and including one or more abstract syntactic annotation tokens in the knowledge structure.

5. The information handling system of claim 1 wherein, during the generation of the knowledge structure, at least one of the one or more processors perform additional actions comprising:

selecting at least one term from the plurality of terms;

for each of the plurality of syntactic annotation tokens that include the selected term, creating a variable syntactic annotation token that replaces the selected term with a variable, resulting in a plurality of variable syntactic annotation tokens; and including the plurality of variable syntactic annotation tokens in the knowledge structure.

6. The information handling system of claim 1 wherein, during the generation of the knowledge structure, at least one of the one or more processors perform additional actions comprising:

for one or more of the plurality of syntactic annotation tokens, creating a relaxed syntactic annotation token that replaces a syntactic relationship identifier with a variable, resulting in a plurality of relaxed syntactic annotation tokens; and including the plurality of relaxed syntactic annotation tokens in the knowledge structure.

7. The information handling system of claim 1 wherein, prior to the generating of the plurality of syntactic annotation tokens, at least one of the one or more processors perform additional actions comprising:

parsing the source document using an English Slot Grammar (ESG) parser, resulting in a plurality of syntactic items that each identify a syntactic relationship between a first one of the plurality of terms and a second one of the plurality of terms, wherein the plurality of syntactic annotation tokes are generated from the plurality of syntactic items.

8. A computer program product stored in a computer readable storage medium, comprising computer program code that, when executed by an information handling system, causes the information handling system to perform actions comprising:

generating a plurality of syntactic annotation tokens based upon a plurality of syntactic relationships between a plurality of terms included in a source document;

creating a knowledge structure that includes the plurality of terms in a plurality of original text fields and includes the plurality of syntactic annotation tokens in a plurality of parallel fields, wherein each of the plurality of syntactic annotation tokens align to at least one of the plurality of original text fields; and generating one or more question-based syntactic annotation tokens corresponding to a question; and utilizing the knowledge structure in a question answer system to generate one or more answers to the question, wherein the question answer system matches at least one of the one or more question-based syntactic annotation tokens to at least one of the plurality of syntactic annotation tokens during the generation of at least one of the one or more answers.

9. The computer program product of claim 8 wherein the information handling system performs additional actions comprising:

analyzing the question and identifying one or more question-based syntactic relationships between question terms in the question;

generating the one or more question-based syntactic annotation tokens based upon the question-based syntactic relationships;

including the question-based syntactic annotation tokens in a query; and using the query in the querying of the knowledge structure.

10. The computer program product of claim 9 wherein the information handling system performs additional actions comprising:

identifying a selected one of the plurality of original text fields that align to the selected parallel field; and generating one or more candidate answers utilizing one or more of the plurality of terms included in the selected original text field.

11. The computer program product of claim 8 wherein, during the generation of the knowledge structure, the information handling system performs additional actions comprising:

matching a selected one of the plurality of terms to an abstract concept entry, wherein the abstract concept entry includes the selected term and a different term;

for each of the plurality of syntactic annotation tokens that include the selected term, creating an abstract syntactic annotation token that replaces the selected term with the different term, resulting in one or more abstract syntactic annotation tokens; and including one or more abstract syntactic annotation tokens in the knowledge structure.

12. The computer program product of claim 8 wherein, during the generation of the knowledge structure, the information handling system performs additional actions comprising:

selecting at least one term from the plurality of terms;

for each of the plurality of syntactic annotation tokens that include the selected term, creating a variable syntactic annotation token that replaces the selected term with a variable, resulting in a plurality of variable syntactic annotation tokens; and including the plurality of variable syntactic annotation tokens in the knowledge structure.

13. The computer program product of claim 8 wherein, during the generation of the knowledge structure, the information handling system performs additional actions comprising:

for one or more of the plurality of syntactic annotation tokens, creating a relaxed syntactic annotation token that replaces a syntactic relationship identifier with a variable, resulting in a plurality of relaxed syntactic annotation tokens; and including the plurality of relaxed syntactic annotation tokens in the knowledge structure.

* * * * *